United States Patent
Grupp et al.

(10) Patent No.: US 7,142,999 B2
(45) Date of Patent: Nov. 28, 2006

(54) METHOD AND DEVICE FOR CORRECTING GUIDING ERRORS IN A COORDINATE MEASURING MACHINE

(75) Inventors: Günter Grupp, Böohmenkirch (DE); Andreas Fuchs, Aalen (DE); Walter Jenisch, Heidenheim (DE); Ralf Bernhardt, Aalen (DE); Harald Schmid, Aalen (DE); Ulrich Staaden, Heidenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 10/944,955

(22) Filed: Sep. 20, 2004

(65) Prior Publication Data

US 2005/0102118 A1      May 12, 2005

Related U.S. Application Data

(63) Continuation of application No. PCT/EP03/00217, filed on Jan. 13, 2003.

(30) Foreign Application Priority Data

Mar. 26, 2002    (DE)    ................. 102 14 490

(51) Int. Cl.
  *G01F 19/00*    (2006.01)
  *G01C 17/38*    (2006.01)
(52) U.S. Cl. ..................... 702/95; 33/502; 702/97; 702/105
(58) Field of Classification Search .......... 702/84, 702/85, 95, 105, 97; 356/500, 559; 33/502, 33/503, 567; 73/1.79
See application file for complete search history.

(56) References Cited

U.S. PATENT DOCUMENTS

| | | | |
|---|---|---|---|
| 4,587,622 A | * | 5/1986 | Herzog ................ 702/97 |
| 4,647,206 A | | 3/1987 | Kunzmann et al. ......... 356/500 |
| 4,939,678 A | | 7/1990 | Beckwith, Jr. ............... 702/95 |
| 5,594,668 A | | 1/1997 | Bernhardt et al. ............ 702/95 |

(Continued)

FOREIGN PATENT DOCUMENTS

DE        33 34 460 A1      4/1985

(Continued)

OTHER PUBLICATIONS

K.J. Schalz, Wetzlar; Thermo-Vollfehler-Korrektur fuer Koordinaten-Messgeraete (Full Thermal Error Correction For Coordinate Measuring Units); Feinwerktechnik & Messtechnik 98 (Precision Engineering And Measurement Technology); 1990; pp. 411-414.

*Primary Examiner*—Bryan Bui
*Assistant Examiner*—John Le
(74) *Attorney, Agent, or Firm*—Harness, Dickey & Pierce, P.L.C.

(57) ABSTRACT

A method for correcting errors in a coordinate measuring machine having a measuring head which is adapted to move in at least two different spatial directions. Measuring scales and measuring lines are assigned to each spatial direction. The measuring lines of different spatial directions intersect, and correction values are determined along the measuring lines at predetermined values of the scales in order to correct for elastic and/or geometric errors of the scales and/or of the guiding mechanism for moving the measuring head. According to one aspect of the invention, the correction values determined along a measuring line of a first spatial direction are modified such that the modified correction value of this measuring line assumes a predetermined value at the point of intersection with a first measuring line of a second spatial direction.

32 Claims, 7 Drawing Sheets

U.S. PATENT DOCUMENTS

| | | |
|---|---|---|
| 5,610,846 A | 3/1997 | Trapet et al. .................. 702/95 |
| 6,513,253 B1 * | 2/2003 | Matsuda et al. ............... 33/502 |
| 6,892,153 B1 * | 5/2005 | Puchtler ..................... 702/105 |

FOREIGN PATENT DOCUMENTS

| | | |
|---|---|---|
| DE | 195 18 268 A1 | 11/1995 |
| DE | 44 36 507 A1 | 4/1996 |
| DE | 198 30 646 A1 | 1/2000 |
| EP | 0 687 890 A2 | 12/1995 |

* cited by examiner

FIG. 5
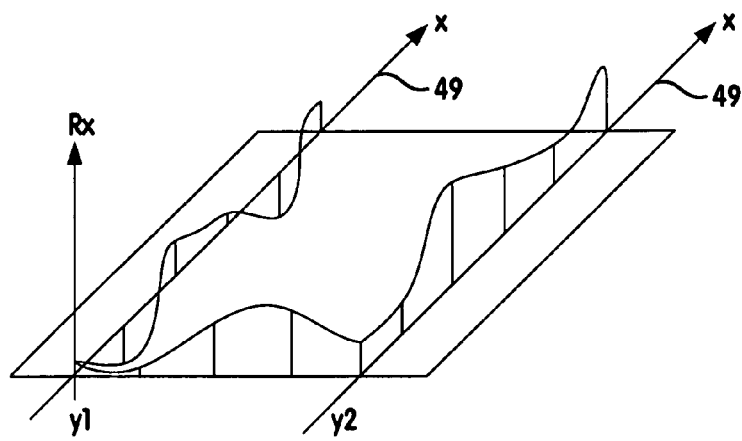
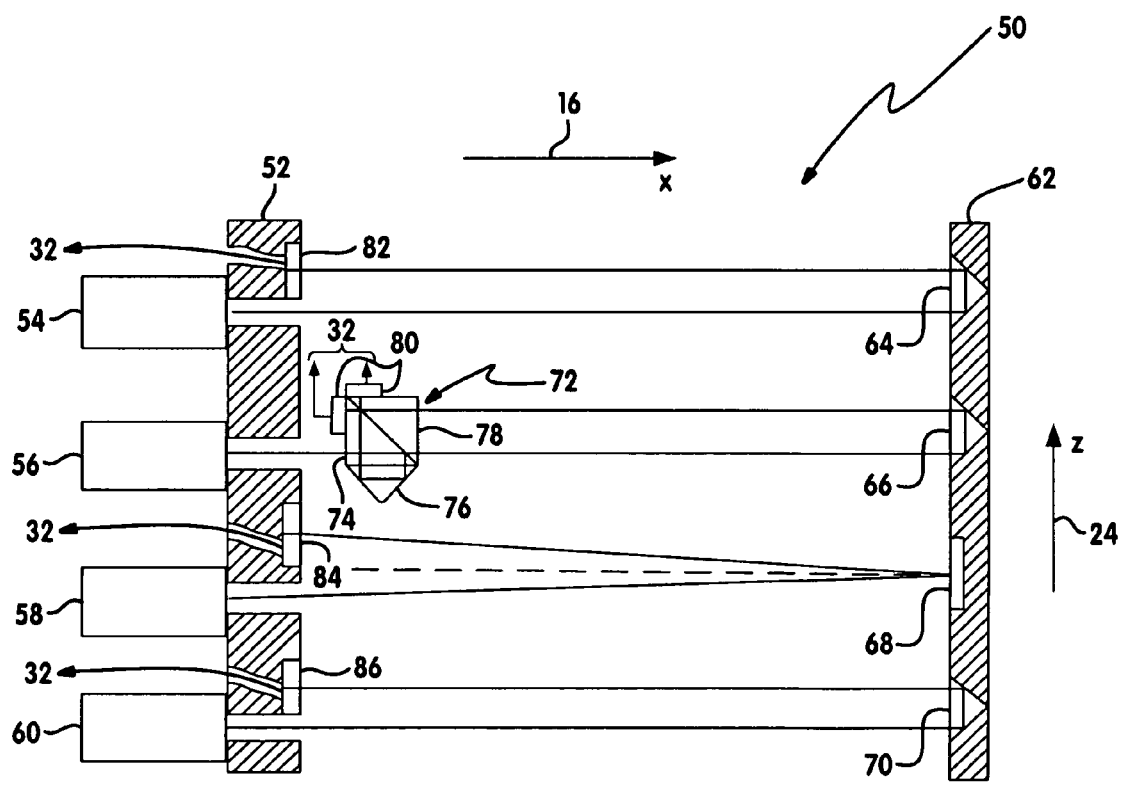
FIG. 6

$$F(P) = (1 - dz)(1 - dy) F(A)$$
$$+ (1 - dz) dy F(B)$$
$$+ dz (1 - dy) F(C)$$
$$+ dz dy F(D)$$

METHOD AND DEVICE FOR CORRECTING GUIDING ERRORS IN A COORDINATE MEASURING MACHINE

REFERENCE TO RELATED APPLICATIONS

This application is a continuation of international patent application PCT/EP03/00217, filed on Jan. 13, 2003 and published as WO 03/081168 in German language, which claims priority under the Paris convention from German patent application DE 102 14 490.7 filed on Mar. 26, 2002.

BACKGROUND OF THE INVENTION

The invention relates to a method and a device for correcting errors in a coordinate measuring machine having a movable measuring head and elements for guiding the measuring head in at least two different spatial directions.

According to DE 33 34 460 A1, a position of a measuring head of a coordinate measuring machine is determined interferometrically. The interferometrical value is compared by means of an evaluation device with values are supplied by a scaling, such as an optically and/or electrically scannable sequence of mechanical marks. Deviations between values supplied from the scales and the values provided by the interferometric acquisition are stored and are used in the operation of the coordinate measuring machine to correct the values supplied from the scales.

So-called guiding errors can be corrected in this way during operation of the coordinate measuring machine. Such guiding errors can be determined not only interferometrically, but also using other measuring means, such as mechanical calibrating apparatuses. A guiding error is understood as a deviation of the true coordinates of the measuring head from the coordinates which are supplied by the scales in this position. The true coordinates are dependant on the position of the guides in this case.

In the case of ideally stiff guides, such deviations between desired and actual positions can be caused by geometrical errors of the guides and/or of the scales. For example, a guide which guides a translational movement of the measuring head can have a manufacturing-induced corrugation that leads to transverse deviations of the measuring head position relative to the direction of the translation.

As an example, in order to correct for these errors, there might be defined a single measuring line (standard line) along each axis of the coordinate measuring machine, with interferometric correction values, for example, being determined in relation to this measuring line (standard method). Correction values at points which are situated in measuring volumes remote from the standard measuring lines are produced in the case of stiff guides by computational interpolation based on measured correction values of the individual standard measuring lines.

However, real coordinate measuring machines have guides which are not ideally stiff. These guides have an elasticity which is dependent on the materials and structures used. This elasticity leads to deformations of the coordinate measuring machine which cause deviations between the actual coordinates and the coordinates supplied by the elastically deformed scales, and which are therefore noticed as errors. In the case of a measuring head which is fitted at the end of a measuring arm which can be extended transverse to the direction of gravity, a flexure of the measuring arm which grows with increasing extension length will occur, for example. Such a flexure causes an elastically caused positional error of the measuring head in the direction of the flexure.

Such elastically caused errors overlap with the geometrically caused guiding errors. It is problematic here that the elastically caused errors and the geometrically caused errors can generally be a function of various influences and axes or spatial directions. The above-described standard method is directed toward the correction of geometrically caused errors, and it is therefore generally not optimal for correcting elastically caused errors. However, raising the accuracy of coordinate measuring machines also requires a correction of elastically caused errors.

DE 195 18 268 A1 discloses a method for measuring coordinates at workpieces, in the case of which the elastic bending behaviour of coordinate measuring machines is simulated by a deformation matrix. This known method delivers a good correction quality, but requires a high outlay on measuring and computing in order to determine the coefficients of the deformation matrix.

SUMMARY OF THE INVENTION

Against this background, it is the object of the invention to provide a high-quality correction even for measuring errors which are caused by elastic deformations of the measuring apparatus. It is another object to keep the required measurement outlay relatively low in order to permit the correction to be used within industrial manufacturing of coordinate measuring machines.

According to one aspect of the invention, these and other objects are achieved by correction values of a measuring line of a first spatial direction being modified such that the correction value of this measuring line assumes a predetermined value at the point of intersection with a measuring line of another spatial direction.

A consequence of this approach is that the modified correction values along the measuring line of the first spatial direction reflect only relative deviations with reference to the predetermined value, while the absolute value information is lost by the modification. Under some circumstances, the absolute value also included an unknown offset resulting from the measuring operation, and it was additionally affected by influences of errors of the second spatial direction. Modifying the correction values such that a predetermined value is set at the point of intersection results in the advantage that these undesired influences from the other spatial direction and from the offset are eliminated such that the remaining, modified correction values of the first spatial direction are no longer dependent on these influences.

In this way, a certain relationship is built up between intersecting measuring lines, and this relationship then consequently permits a relationship between measuring lines running in parallel which are intersected by a transverse measuring line. This relationship between parallel measuring lines constitutes a precondition of the inventive correction of elastically caused errors with the aid of parallel measuring lines.

In accordance with an advantageous refinement, the modification of the correction values is performed by combination with an additive offset.

This procedure is advantageous due to an exceptionally low computational outlay.

In accordance with a further refinement, the predetermined value is equal to zero.

A very low requirement for storage space results as an advantage from the fact that there is a need to store only deviations from zero.

According to a further refinement, the first spatial direction is assigned a number of measuring lines which run along this spatial direction.

The use of a number of measuring lines in one spatial direction, in conjunction with the inventive reference to a predetermined value, permits a quantitative acquisition of elastic influences transverse to the first spatial direction A further refinement of the invention comprises a further modification of the correction values as a function of a second measuring line of the second spatial direction.

This refinement permits a compensation of effects which are caused by undesired deviations of the measuring line directions from desired directions while recording the associated errors or correction values.

One embodiment of this refinement is characterized by the fact that a curve which joins the correction values of the measuring line, which runs in the first spatial direction, is manipulated such that after the manipulation the correction value of this measuring line assumes a predetermined value at the point of intersection with the second measuring line of the second spatial direction.

This embodiment advantageously permits the above-mentioned undesired effects to be compensated easily by computation.

According to a further embodiment of this refinement, the predetermined value is equal to zero. In accordance with a further embodiment, the curve is manipulated outside a fixed point which is formed by the predetermined value of the modified correction value of this measuring line at the point of intersection with the first measuring line of the second spatial direction.

Such a manipulation can be obtained, for example, from the equation $fg(x_i)=f(x_i)-(h/x_h)*x_i$, with $f(x_i)$ representing a sequence of correction values about points $x_i$ of a measuring line of a first spatial direction, and h specifying the distance of the correction value $f(x_h)$ from the value of zero at the point of intersection of this measuring line with the second measuring line of the second spatial direction. The result of this is a manipulation of the curve $f(x_i)$ about the zero point.

These embodiments are likewise characterized by a simple computational implementation.

In accordance with a further refinement of the invention, the measuring lines of the first spatial direction are additionally subjected to a rectangularity measurement with reference to a normal to the plane which is defined by a number of measuring lines of the first spatial direction. A deviation in the rectangularity of each single measuring line from a common reference value is formed and there follows a manipulation of the curves of the correction values of the individual measuring lines, the extent of the manipulation being determined by the said deviation.

This embodiment advantageously permits compensation of deviations of the measuring line directions from a desired value which deviations lead out of the plane of the measuring lines.

Computationally simple compensation of this effect results according to a further embodiment by virtue of the fact that the extent of the manipulation is proportional to said deviation. Here, the term manipulation respectively defines, for example, a correction of the curve by subtraction of a straight line.

In accordance with a further advantageous refinement, the correction values of a predetermined measuring line from a multiple spectrum of measuring lines running along the first spatial direction are subtracted from the associated correction values of these measuring lines.

The effect of this subtraction is that the remaining relative corrections or errors of parallel measuring lines are related to the corresponding values of a standard line. Since the geometrical errors of the parallel measuring lines under consideration are equal, this subtraction advantageously results in elimination of these geometrical errors, with the result that the remaining values are determined solely by elastically caused errors.

The data obtained in this way for an elastic correction or for the elastically caused error which is to be corrected are therefore independent of the geometrical guiding errors, and can be either kept constant for a type of coordinate measuring machine, or be adapted by means of simple measurements.

It is to be seen as a further advantage that these data include only long-period components for elastic correction, and can therefore advantageously be smoothed by means of filters of known type.

Consequently, for each individual machine of a series of machines, guiding errors need only be measured by means of a standard procedure. In other words, there is no need to redetermine errors from elastic deformations for each individual coordinate measuring machine.

A further advantage is to be seen in that the origin of the correction data can be accomplished in accordance with the separation indicated, and can be visualized separately.

This also provides the possibility of individual corrections being excluded or introduced in a simple way (elastic and geometric fashion for individual machines, elastic fashion for type series).

Furthermore, the order of the correction of guiding errors of individual machines and elastic errors typical for type series can also be selected as desired in the case of a two-stage correction.

To this end, it is advantageous for the correction values of the predetermined measuring line (standard line) running along the first spatial direction to be stored as first correction values in a correction value memory.

These first correction values are advantageously determined individually for an individual coordinate measuring machine and stored. They include the geometrical guiding errors of individual machines and the components of the elastic errors for individual machines.

A further embodiment provides that the results obtained from the subtraction are stored as second correction values in the correction value memory.

These second correction values include components of elastically caused errors which are typical of type series and are therefore not tied to individual machines. These second correction values are advantageously determined in the case of an individual coordinate measuring machine of a specific type, and stored in correction value memories of other measuring machines of the same type. Accompanying this is the particularly great advantage that the measurements which go beyond the standard procedure need not be undertaken for each individual machine. Rather, it is sufficient for these measurements to be recorded for an individual machine of a series type as representative of the other machines of the series type.

In accordance with one refinement of the invention, guiding errors of coordinate measuring machines are corrected during operation of the coordinate measuring machines on the basis of the first and the second correction values. This type of correction permits correction both of the geometrical errors and elastic errors of individual machines, on the one hand, and of the elastic errors typical of series type, on the other hand. This correction can be supplemented by absolute error information obtained when recording standard lines.

In accordance with a further refinement of the invention, correction values for points which are not situated on the measuring lines are determined by means of interpolation of correction values from at least two measuring lines.

The interpolation permits a restriction of the number of measuring lines to be recorded, since it permits correction values to be obtained between the measuring lines by means of a computational method. As already remarked above, this interpolation presupposes a common relationship between the measuring lines.

The interpolation can be based on a two-dimensional interpolation method or a three-dimensional interpolation method.

A typical coordinate measuring machine suitable for using the said method is a horizontal arm measuring machine, which has a column which can move in the X direction and supports a horizontal arm, the arm being movable in the Y direction and in the Z direction, and having a measuring head. Because of the elastic deformations occurring upon extension of the horizontal arm, the above-mentioned advantages result in particular extend for such a coordinate measuring machine.

The application of the invention is not, however, limited to such a horizontal arm measuring machine, but can be applied to every coordinate measuring machine in which elastic deformations occur. An example of a further coordinate measuring machine is a so-called gantry machine which has a gantry, movable in the Y direction, and a carriage, which can move on the gantry in the X direction and which supports a center sleeve which is movable in the Z direction, with a measuring head. Coordinate measuring machines of cantilever design or having any desired other kinematic chains constitute further exemplary embodiments.

Further advantages follow from the description and attached figures.

It goes without saying that the above-named features and the following ones still to be explained can be used not only in the combination respectively specified, but also in other combinations or on their own, without departing from the scope of the present invention.

BRIEF DESCRIPTION OF THE DRAWINGS

Exemplary embodiments of the invention are illustrated in the drawing and explained in more detail in the following description. In the drawing:

FIG. 5 shows the profile of a rotation error related to the X axis in the case of various movements of the measuring head of the horizontal arm measuring machine from FIG. 1;

FIG. 6 shows a laser measuring machine for recording the translational and rotational errors;

DETAILED DESCRIPTION OF PREFERRED EMBODIMENTS

Figure 1:
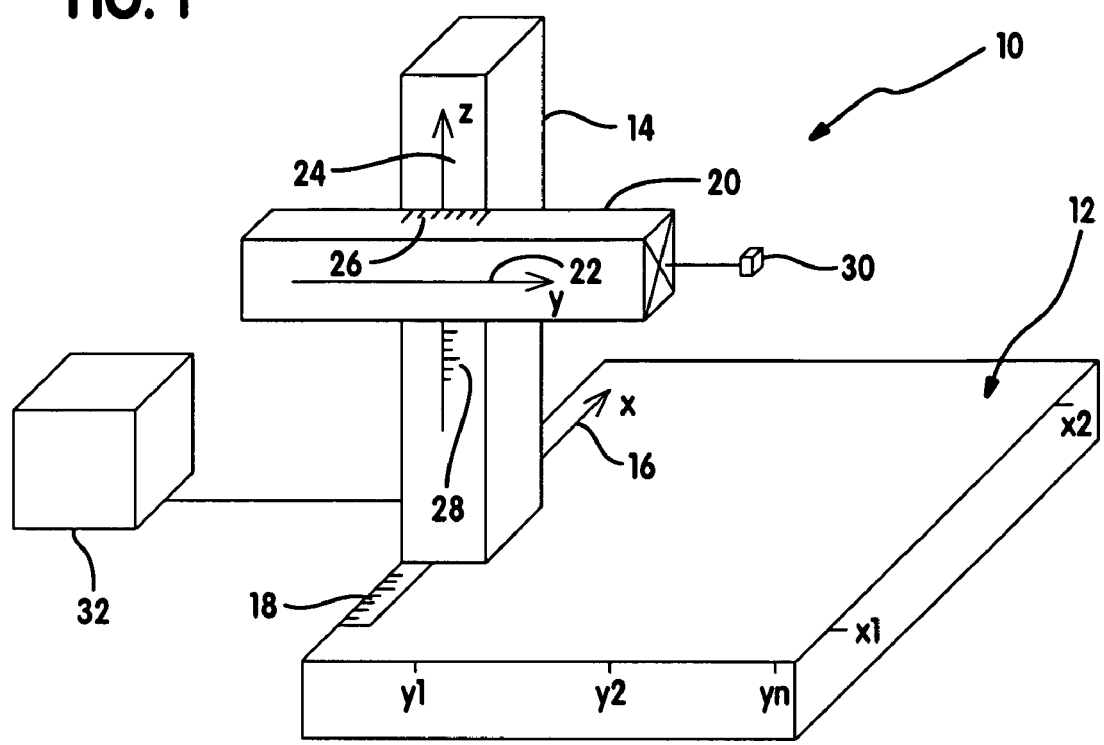
FIG. 1 shows a horizontal arm measuring machine as an example of a coordinate measuring machine.

An overall view of a horizontal arm measuring machine as an example of a coordinate measuring machine is denoted by numeral 10 in FIG. 1. The horizontal arm measuring machine 10 has a reference plane 12 on which a column 14 can move along an X direction 16. The reference plane 12 is, for example, a measuring table or as flat as possible a surface in space. The position of the column 14 can be read off an X scale 18. The column 14 supports horizontal arm 20 which can move in the Y direction 22 and Z direction 24. The Y position of the horizontal arm 20 and its Z position can be read off on a Y scale 26 and a Z scale 28, respectively. The horizontal arm 20 supports a measuring head 30 with the aid of which workpiece positions or components can be approached. The X, Y and Z positions reached by the measuring head 30 when touching the components can be read off on the said scales, and/or acquired by suitable sensor systems and transmitted to an evaluation apparatus 32 for further processing.

Figure 2:
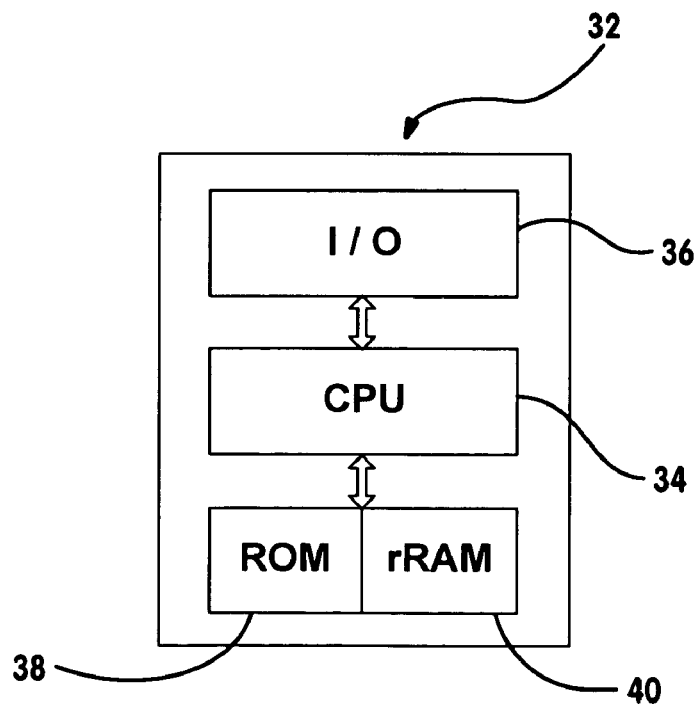
FIG. 2 shows the structure of an evaluation apparatus from FIG. 1.

FIG. 2 illustrates the structure of such an evaluation apparatus 32. Accordingly, a central processing unit 34 switches between input sections and output sections of an input and output device 36 in accordance with programs stored in a program memory 38 and by using data stored in a correction value memory 40.

Figure 3:
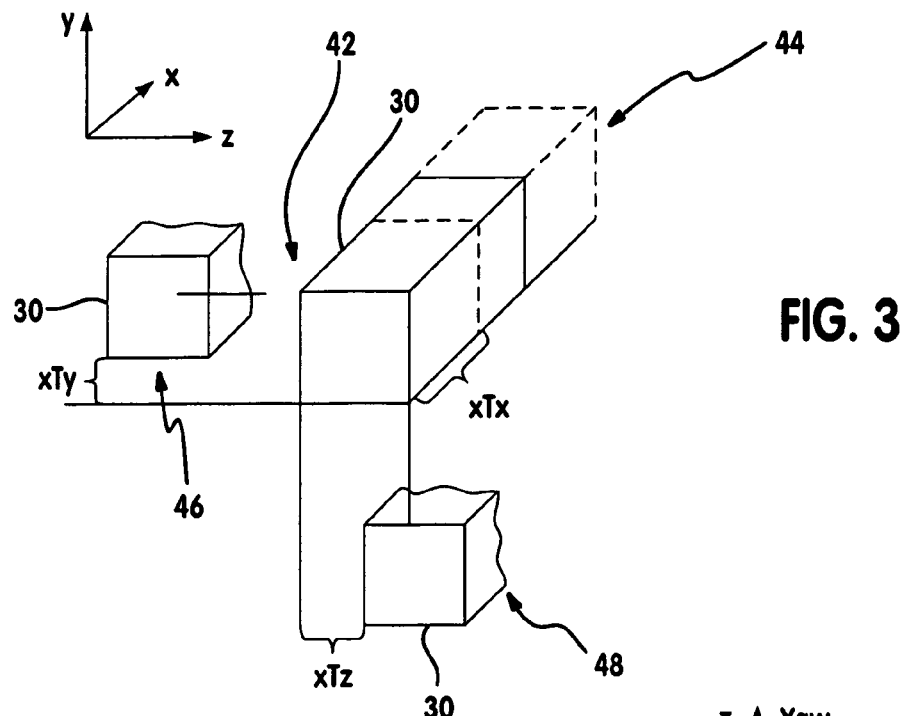
FIG. 3 shows an illustration for explaining translational errors.

FIG. 3 illustrates translational errors such as occur during operation of the coordinate measuring machine and of the horizontal arm measuring machine 10. In this case, the numeral 42 denotes a non-errored position of the measuring head 30. Numeral 44, by contrast, denotes a position of the measuring head 30 which differs from the non-errored position by a distance xTx. Here, the first x (on the left) denotes the direction of movement of the measuring head, the letter T indicates that the movement is a translation, and the second x (on the right) specifies the direction of the error represented. Consequently, xTx corresponds to a positional error in the X direction which occurs on a translation in the X direction. A typical cause for such an error would be an inaccuracy of the X scale 18.

Numeral 46 denotes the position of the measuring head 30 with a positional error in the Y direction. This error is noted here as xTy. Thus, xTy represents some sort of a linearity deviation. Such an error is caused, for example, by a waviness of the X guide, which leads to a transverse deviation y in the case of a translation in the direction of the X axis.

The numeral 48 denotes the position of the measuring head 30 with a positional error xTz in the Z direction. Here, as well, the notation is based on a translatory movement in the X direction, something which is expressed by the first two letters x and T. The transverse deviation in the Z direction typically results, as also does the previously described transverse deviation in the Y direction, due to a waviness (lack of straightness) of the X guide.

FIG. 3 shows that X, Y and Z translational errors for movements in the direction of the X axis. X, Y and Z errors occur analogously upon movement in the direction of the Y axis and upon movement in the direction of the Z axis, the result being a total of 3×3=9 possible translational errors.

Figure 4:
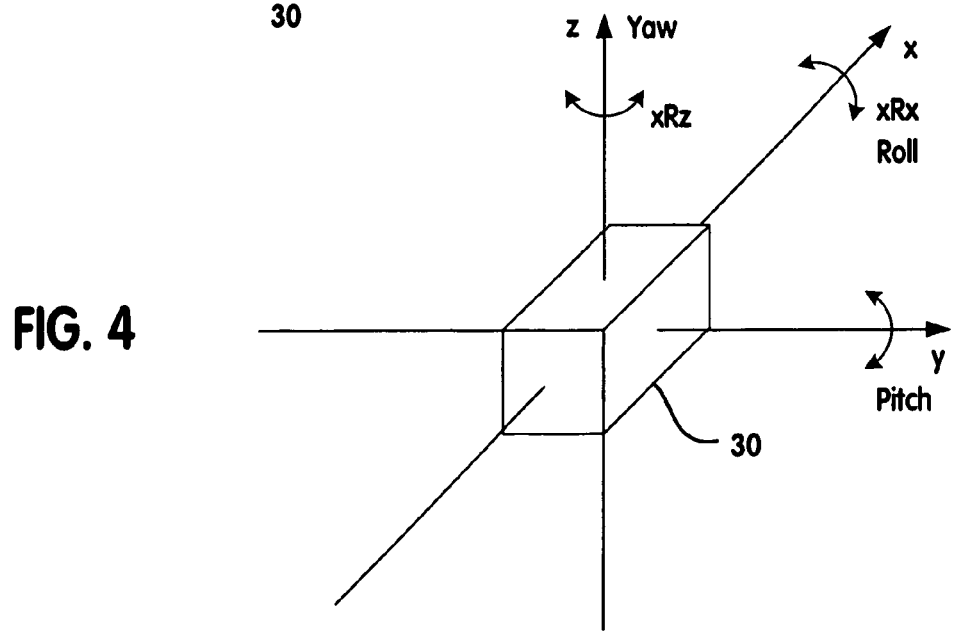
FIG. 4 shows an illustration for explaining rotational errors.

FIG. 4 illustrates three possible rotational errors for movements of the measuring head 30 in the direction of the X axis. Here, the error xRx denotes rotations about the X axis for movement in the direction of the X axis, and thus a so-called rolling of the measuring head 30. A rotation about the Y axis upon movement in the direction of the X axis is denoted as pitching, and a rotation about the Z axis upon movement in the direction of the X axis is denoted as yawing.

FIG. 4 therefore represents three possible rotational errors for movement in the direction of the X axis. Rolling, pitching and/or yawing can also occur analogously in the case of movements in the direction of the Y axis as well as for movements in the direction of the Z axis, and so 3×3=9 possible errors also result in the case of rotation.

FIG. 5 illustrates possible profiles of rotations about the X axis (Rx) for various movements of the measuring head 30. The curves over the parallel measuring lines 49 correspond to xRx errors, and the curve over the straight line connecting the points y1 and y2 corresponds to a yRx error. The tendency to be seen here is that the Rx error becomes larger with increasing y (y2>y1). This is a typical effect such as is to be expected in the case of a horizontal arm measuring machine 10 where there is addition of geometrical and elastically caused errors (these errors can, however, also be of different sign and are then subtracted). The further the horizontal arm 20 is extended, the larger is the resulting torque about the X axis, and this is absorbed by an elastic deformation of the column 14 and of the horizontal arm 20. The elastic deformations result in the trend in the Rx values which rises from left to right in FIG. 5. The short wave minima and maxima which are expressed on the profiles illustrated in FIG. 5 typically result from the geometrical guiding errors of the X and Y guides.

FIG. 6 shows a laser measuring device 50 with the aid of which it is possible to record the profiles illustrated in FIG. 5. The numeral 52 denotes a base which supports four lasers 54, 56, 58 and 60, for example laser diodes, together with a focussing unit. The base 52 is, for example, connected to the reference plane 12 of the horizontal arm measuring machine 10 in a defined fashion. A reflector arrangement 62 with reflectors 64, 66, 68 and 70 is connected to the measuring head 30. The light emitted by the lasers 54, 56, 58 and 60 is reflected by the reflectors 64, 66, 68 and 70 and recorded by photodetectors 80, 82, 84 and 86. The measuring head is moved with the reflector arrangement 62 in the direction of the laser beams. Rotations and translatory displacements which occur lead in this case to changes in the intensity, recorded by the photodetectors 80, 82, 84 and 86, of the reflected laser beams. The profiles illustrated in FIG. 5 can be produced from these changes in intensity.

Thus, for example, the interferometer 72 can be used to determine positional errors in the direction of movement of the measuring head and consequently of the reflector arrangement 62. The laser beam emitted by the laser 56 is split at the interface between the prisms 74 and 78 into a measuring beam and a reference beam. The reference beam is directed onto photodetectors 80 with the aid of the prism 76 and the boundary surface between the prisms 74 and 78. The reference beam therefore has a defined length. The measuring beam leaves the prism 78 and is reflected by the reflector 66, for example a silvered cube corner. The prisms 74 and 78 direct the reflected beam onto the photodetectors 80 such that the reference beam and reflected beam are superimposed. The reflected beam or measuring beam has a variable length which is a function of the spacing of the reflector arrangement 62 from the base 52. Depending on the path difference between the reference beam and measuring beam, interference after the union of the beams results in amplification or extinction. The movement of the reflector arrangement 62 results in a sequence of brightness maxima and minima at the spacing of half wavelengths. A linear measure with the fineness of half a wavelength, for example, is yielded by counting the maxima. Thus, the result for a wavelength of 600 nm, for example, is an accuracy of the order of magnitude of tenths of a micrometer. It is thereby possible when the measuring head is moved in the direction of the X axis to determine positional errors with this accuracy in this direction (xTx).

The light emanating from the laser 58 is reflected by a flat mirror 68 on the photodetector 84. Yawing and pitching movements of the reflector arrangement 62 are therefore imaged directly in the intensity distribution on the photodetector 84. Rotational pitching and yawing errors can therefore be determined by evaluating this intensity distribution.

Figure 7:
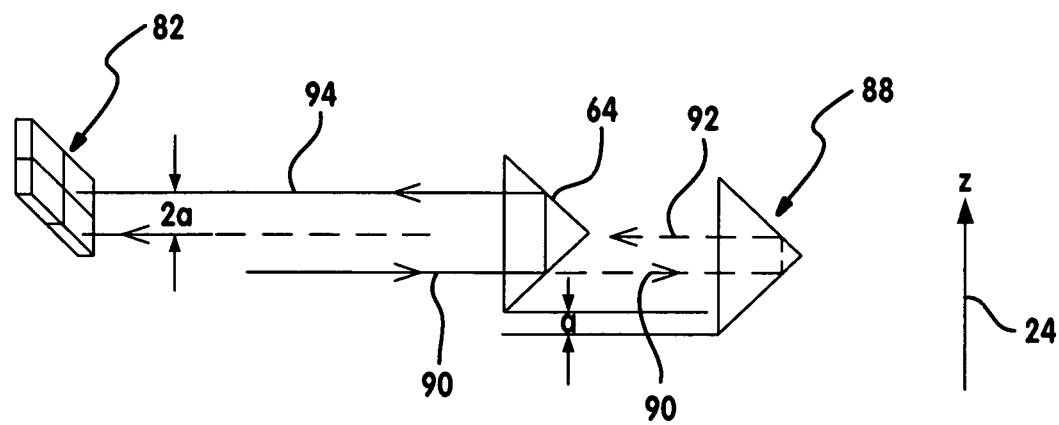
FIG. 7 shows a schematic representation for explaining a measurement of straightness.

Rolling movements can be determined by evaluating the signals of the photodetectors 82 and 86. A single photodetector 82 or 86 can be used firstly to determine transverse displacements of the reflector arrangement 62. This is illustrated by FIG. 7. The reflector 64 can be implemented, for example, as a silvered cube corner and has the property of retroreflecting incident light parallel to the direction of incidence. In the position denoted by 64, for example, the reflector 64 reflects the incident beam 90 onto the photodetector 82 as reflected beam 94. The numeral 88 denotes the reflector 64 in a position displaced transverse to the incident laser beam by the amount a opposite to the Z direction. In this case, the light incident on the reflector 64 is reflected as light beam 92. As may be seen from the figure, the light beam 92 is incident on the photodetector 82 at the spacing 2 *a from the light beam 94. Transverse displacements a can therefore be detected by evaluating the intensity distribution on the photodetector 82. In the illustration of FIG. 6, the simultaneous occurrence of a transverse movement of the reflector 64 out of the plane of the drawing and a transverse movement of the reflector 70 into the plane of the drawing (or vice versa) corresponds to a rolling movement about the X axis. It is therefore also possible for a rolling movement to be detected and acquired quantitatively with the aid of the laser arrangement shown.

Figure 8:
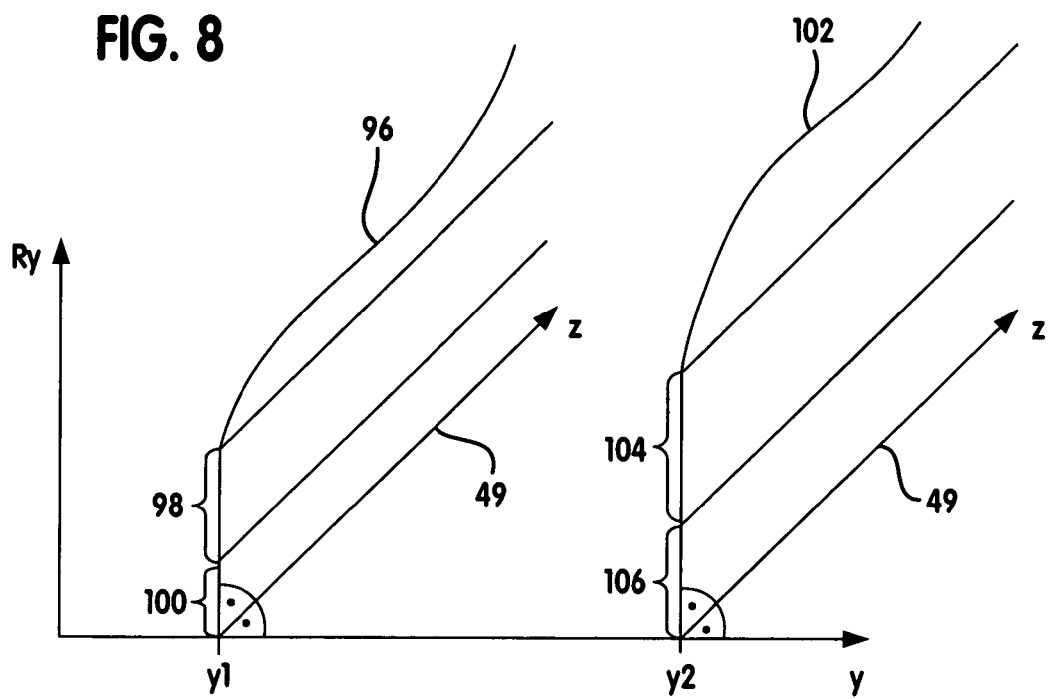
FIG. 8 shows two profiles, related to the Y axis, of rotational errors with different error components.

In order to detect the various translational and rotational errors, the signals of the photodetectors 80, 82, 84 and 86 can, for example, be fed to the evaluation apparatus 32. FIG. 8 shows rotational errors Ry such as can be acquired with the aid of the laser measuring device 50 described above. Here, numerals 49 denote measuring lines which run in the Z spatial direction and have been measured at a first Y position y1 and a second Y position y2. The numerals 96 and 102 denote the associated zRy profiles. The errors zRy1 (numeral 96) include two constant components 98, 100 and a variable remainder.

The constant error component 98 can result, for example, from a geometrical guiding error of the Y guide at the position y1. This geometrical error component then remains constant for the illustrated movement along the Z axis with constant y1.

The constant error component 100 can correspond to a measuring error (offset) which is caused by the adjustment of the laser base 52 or of the reflector arrangement 62, and remains constant during movement of the measuring head 30 with the reflector 64 along the Z spatial direction.

In an entirely analogous way, the curve 102, that is to say the profile of the error zRy at the position y2 has a constant error component 104 as geometrical guiding error of the Y guide, and a constant measuring error 106 (offset).

Since the laser measuring device 50 was newly mounted and adjusted in each case for the recording of the error curves 96 and 102, the offset errors 100 and 106 resulting from these mountings are generally not equal. This holds analogously for the errors 98 and 104 of the Y guide, which are generally different at different points y1, y2. Because of the different magnitudes of the constant error components, the absolute values of the zRy error curves 96 and 102 cannot be directly compared. This is problematical, in particular, whenever the aim is to interpolate between the lines. The error curves 96 and 102 need to have the same absolute relationship for a correct interpolation. For the reasons illustrated, this is not automatically the case when simply measuring a number of individual lines.

According to the invention, the profiles of rotational errors (here zRy1, zRy2) at defined positions are set to a predetermined value. Such positions are defined, for example, by points of intersection of the measuring line 49 of the first spatial direction with a measuring line of a second spatial direction. In the illustration of FIG. 8, the connection of the points y1 and y2 could form a measuring line of a second spatial direction. In this case, the error curves 96 and 102 each are additively displaced until they assume the value zero at their respective point of intersection with the join of the points y1 and y2. A common relationship is thereby produced between the rotations zRy1, zRy2 and, if appropriate, yRy. The residual errors remaining after the displacement over the measuring lines 49 specify the relative changes in errors or corrections respectively for movements along the Z spatial direction.

This eliminates the problem of the initially lacking relationship between the rotation error curves. Further problems arise from the fact that the direction of the measuring lines which are defined by the laser beam direction deviates from the desired direction. This plays a role, in particular, in the acquisition of translational errors.

Figure 9:
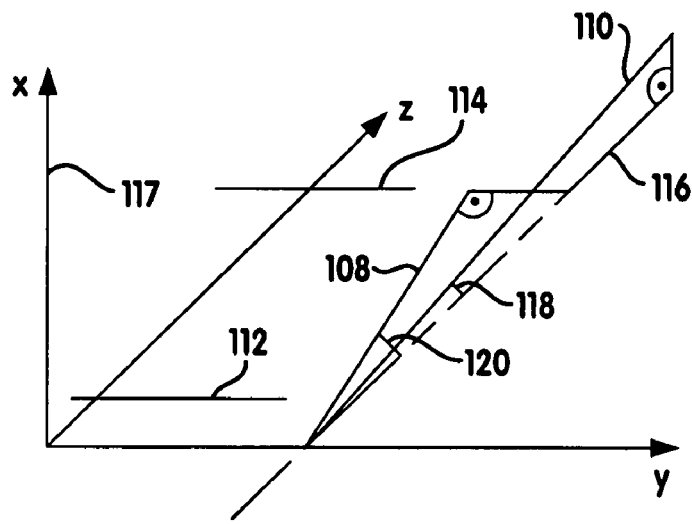
FIG. 9 shows angular errors in the recording of measured values along specific measuring lines.

Such deviations in direction or angular errors in the case of recordings of measured values are illustrated by FIG. 9. FIG. 9 shows a ZY plane with a vertical line 117. Numeral 116 denotes the desired direction, and thus the ideal position of measuring lines. The numeral 108 denotes a measuring line of a first spatial direction which is admittedly situated in the YZ plane but deviates in this plane from the desired direction 116 by an angular deviation 120. The numeral 110 correspondingly denotes a measuring line of a first spatial direction which deviates from the desired direction 116 by an angular deviation 118, this deviation being directed such that it leads out of the YZ plane. The numeral 112 denotes a first measuring line of a second spatial direction, and the numeral 114 denotes a second measuring line, parallel thereto, of the second spatial direction. The first measuring line 112 serves to define points of intersection for producing the relationships between different error curves, as was explained in conjunction with FIG. 8. The second measuring line 114 represents some sort of an auxiliary transverse line which can be used to compensate the effects of the angular errors illustrated. This will be explained below.

Figure 10:
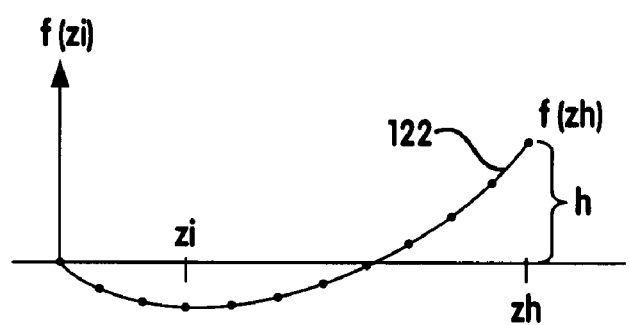
FIG. 10 shows effects of these angular errors.
Figure 11:
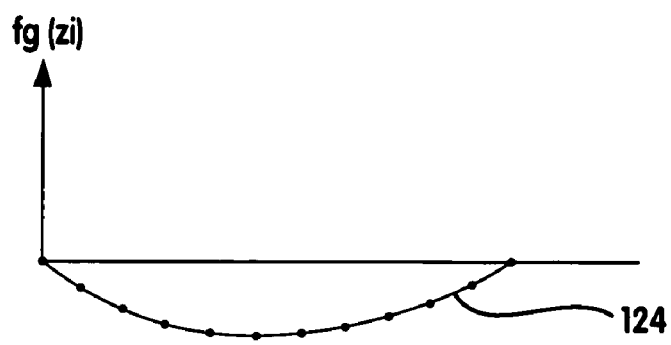
FIG. 11 shows results of a correction of these angular errors.

FIG. 10 shows a typical profile of a curve of correction values which are recorded with an angular error of a measuring line. On the left side, the curve has been displaced to the zero point, as was explained in conjunction with FIG. 8. The profile rising to the right results from an angular error 118 or 120. The directional errors illustrated in FIG. 9 give rise during the measurement operation to apparent transverse deviations which are not present in reality and therefore undesirably falsify the measurement results. With increasing spacing, these apparent transverse deviations grow such that the defective profile of the curve 122 illustrated in FIG. 10 can result. In this case, the curve 122 is defined by virtue of the fact that it joins different measured errors or correction values corresponding thereto. According to the invention, this error is compensated by manipulating the curve 122 computationally about its left-hand origin until its right-hand end reaches a predetermined value, preferably the value zero. In this case, the right-hand end coincides with the point of intersection of the measuring line 116 and the auxiliary transverse line 114. The auxiliary transverse line 114, which was also denoted above as a second measuring line of the second spatial direction therefore serves to compensate angular errors 118, 120. The curve 124 in FIG. 11 shows the result of the inventive manipulation of the curve 122.

It was described above how a common reference for individually recorded rotational error curves can be produced, and how directional errors in translational error curves can be removed. The error values left over after the described conditioning of the acquired values still include elastically caused and geometrically caused error components. Explained below is a further refinement of the invention, which permits a far reaching, if still not complete, separation of elastically caused guiding errors and geometrically caused guiding errors.

Figure 12:
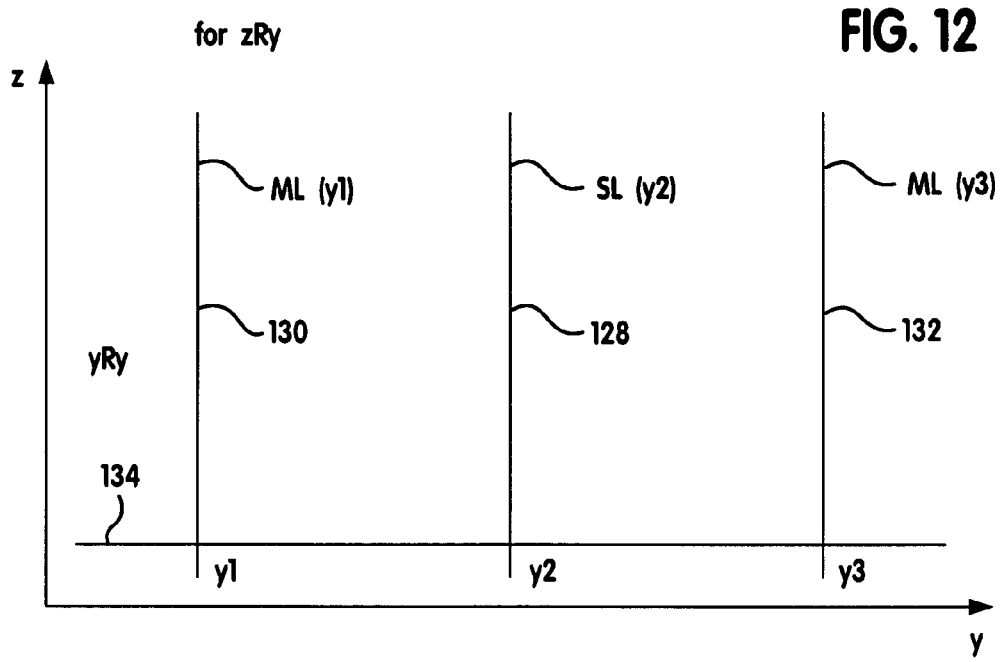
FIG. 12 shows a multiple spectrum of measuring lines with a standard line and two additional multiple lines.

FIG. 12 shows a multiple spectrum 126 of measuring lines 128, 130 and 132, which extend in the Y, Z plane along the Z direction as first spatial direction. Plotted over these measuring lines are rotations about the Y axis in the case of movement in the Z direction, that is to say the zRy errors, or else the correction values for compensating precisely these errors. The measuring lines 128, 130 and 132 are intersected by a first measuring line 134 of a second spatial direction (y here). This measuring line arrangement can be used to acquire elastically caused modifications of rotational errors with reference to the Y axis in the case of movements in the direction of the Z axis.

Consideration is firstly given to the horizontal arm measuring machine 10 from FIG. 1 in order to illustrate such influences. Extension of the horizontal arm 20 naturally results in elastic flexures which are a function of the extension length, that is to say of the values y1, y2 and y3 in the image of FIG. 12. These elastic flexures are superimposed with a geometrical guiding error which occurs as rotation along the Y guide. The superimposition of the geometrically caused rotation of the horizontal arm 20 with its elastic flexure corresponds physically to a rotation of an arcuate beam. During the rotation of an arcuate beam, the deepest line end of the arcuate beam is rotated out of its deepest position. As a consequence of gravity, this rotation out of the deepest position necessarily gives rise to restoring torque which leads to an elastic torsion of the beam.

This elastic torsion is superimposed with the geometrically caused rotation. Finally, the result of the superimposition is measured. Different flexures, and thus different restoring torques and therefore different torsions occur depending on extension length (y1, y2, y3). The result of this is elastically caused influences differing in strength depending on the Y position (y1, y2, y3), on rotations about the Y axis for movements along the Z axis.

Similar effects also occur in other spatial directions, for example a zRx guiding error can occur in the X direction. The measuring line arrangement illustrated in FIG. 12 is therefore to be appraised only as an example.

Figure 13:
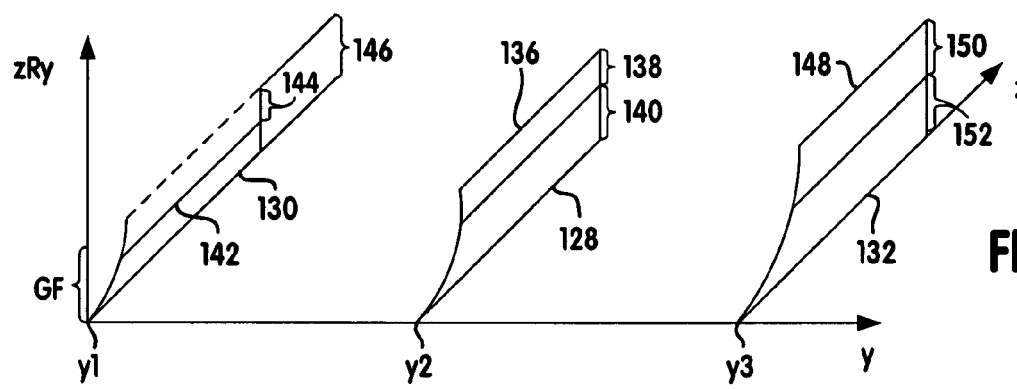
FIG. 13 shows a qualitative representation of remaining errors after removal of the offset.

Error profiles zRy1, zRy2, zRy3 or correction values referred to these errors, are plotted along the measuring lines 128, 130, 132 in the way described above. Furthermore, the relationship is produced between these zRy curves and the yRy curves over the measuring line 134 of second spatial direction by additively displacing the zRy curves, as was described in conjunction with FIG. 8. If appropriate, an angular correction is further performed by manipulation of the curves, as was described in conjunction with FIGS. 9 to 11. This manipulation or angular correction is important in the case of translations, and can be omitted if appropriate when considering rotations. In qualitative terms, the zRy values remaining after these corrections have the composition in FIG. 13. Here, the zRy profiles are illustrated as being essentially constant for reasons of clarity.

The zRy profile 136 over the measuring line 128 has, for example, a geometrically caused component 140 and an elastically caused component 138. Analogously, the zRy profile 142 over the measuring line 130 has a geometrical component 146 and an elastically caused component 144 with a negative sign. In the same way, the zRy profile 148 over the measuring line 132 has an elastically caused component 150 and a geometrically caused component 152.

As regards the geometrically caused components, it is important here that different geometrically caused errors resulting from different Y positions have already been subtracted in the case of the displacement of zRy curves in accordance with FIG. 8. The geometrically caused error components now still remaining in FIG. 13 therefore result from geometrical influences of the guide in the Z direction.

These influences are the same for the three measuring lines 128, 130 and 132. It results therefrom as an important conclusion that the remaining geometrical influences can be eliminated by a further subtraction.

Figure 14:
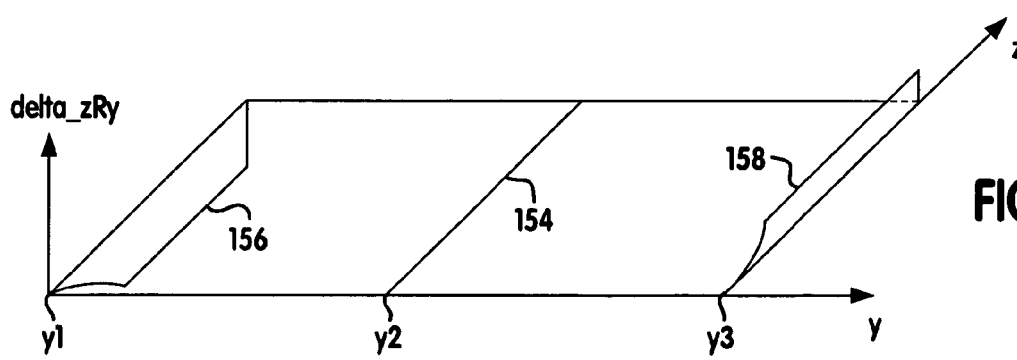
FIG. 14 shows a qualitative representation of remaining errors after normalization of the multiple lines from FIG. 12 to the standard line of FIG. 12.

According to the invention, one of the measuring lines 128, 130, 132 of the multiple spectrum 126 is selected as reference line. This is typically, but not necessarily, the standard line 128 (SL(y2)) situated in the middle of the measuring range. Inaccuracies which increase with the spacing are minimized by the middle position. The zRy values of this standard line 128 are subtracted from the corresponding zRy values of the remaining parallel measuring lines 130 and 132. As illustrated in FIG. 14, this results in zRy values which no longer include geometrical components of any sort.

Physically, these remaining values correspond to the changes in the elastic influences upon transition from the standard line 128 to a line which is parallel thereto. According to the invention, a far reaching, if not complete separation of elastically caused errors and geometrically caused errors is achieved in this way. Separation is far reaching to the extent that the remaining zRy values over the measuring lines 130 and 132 no longer include geometrically caused components of any sort. On the other hand, the separation is not complete, because the zRy values of the curve 136 over the standard measuring line 128 still have geometrically caused components 140 and elastically caused components 138.

The far-reaching separation, achieved according to the invention, of the elastically caused influences from the geometrically caused influences is greatly advantageous. Thus, for example, the remaining elastically caused influences, which represent elastically caused changes by comparison with the values of the standard line, are largely constant for coordinate measuring machines of a specific type. In particular, they are not influenced by geometrical guiding errors of individual machines. These geometrically caused guiding errors of individual machines can be acquired for each machine by measuring a few standard lines. By contrast, in the case of an individual coordinate measuring machine the additional elastically caused changes can be recorded by way of representation of the entire type series of these coordinate measuring machines. These values can then simply be stored in a correction value memory for individual machines in addition to the standard lines recorded for the individual machines.

In this way, the invention also permits a correction of elastically caused guiding errors in conjunction with a low outlay which, when consideration is given to a single machine, does not exceed the outlay previously expended for recording the standard lines.

Figure 15:
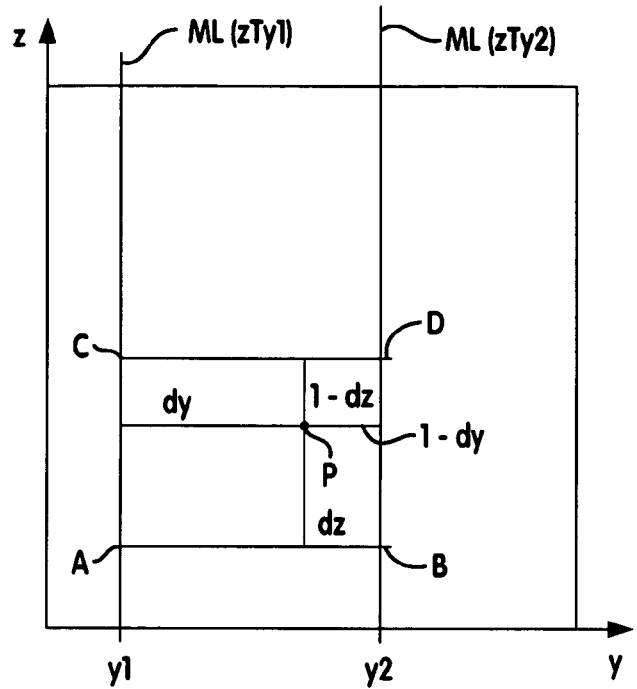
FIG. 15 shows geometrical relationships relating to a two-dimensional interpolation method.

FIG. 15 shows an interpolation method for determining and/or correcting errors of any desired points P in the measurement volume of a coordinate measuring machine. Here, the measuring line ML(zTy2) corresponds, for example, to a standard line for whose points B and D associated correction values F(B) and F(D) are stored in the correction value memory as first correction values. The measuring line ML(zTy1) corresponds to a measuring line parallel to the standard line such as was measured by way of presentation for the associated type series of the coordinate measuring machines in the case of an individual coordinate measuring machine. The correction value memory 40 correspondingly contains for the points C and A of this line the changes in the elastically caused errors/corrections by comparison with the values of the points B and D of the standard line. The correction values/errors F(A) and F(C) can then be determined from the values F(T), F(B) and the changes for the points C and A. The error/correction value of any desired point P can then be determined for the four values F(A), F(B), F(C), F(D) by the interpolation illustrated in FIG. 15. According to this selfexplanatory representation, the error F(P) at the point P has, for example, a value, weighted with the area (1-dy)*(1-dz) of the error/correction value of the point A, as well as the error/correction value, weighted with (1-dz)*dy, of the point B, the error/correction value, weighted with dz*(1-dy) at the point C, and the error/correction value, weighted with dz*dy at the point D.

It was explained in conjunction with FIGS. 9 to 11, how a directional relationship can be established between different measuring lines. As an alternative to the method described in conjunction with FIGS. 9 to 11, it is also possible in the case of Z translations to align the Z translations parallel to the direction of gravity by means of high-precision electronic inclination scales in the same horizontal position, and thus to establish the directional relationship. Since the measuring lines must always be recorded with reference to the reference plane of the coordinate measuring machine, which reference plane can also tilt as the coordinate measuring machine moves, it is particularly advantageous for this purpose to align the Z translations with the difference of two electronic inclination scales, in which case, for example, one set of inclination scales is mounted directly on the reference plane of the coordinate measuring machine, and the other is mounted on the laser measuring device for the Tz measurement.

Figure 16:
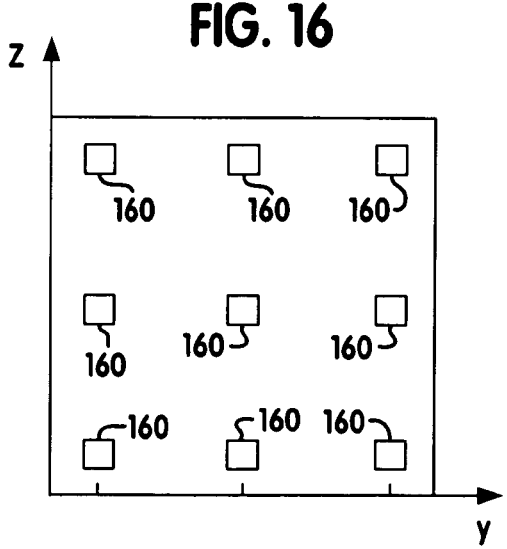
FIG. 16.

Furthermore, translations can be aligned by measuring suitable points on a large calibrated plate. The measurement and evaluation are performed in this case in the direction of the translations. In the case of X translations, it is possible, for example, to use a reference plane, calibrated in the X direction, of the coordinate measuring machine for the purpose of producing the directional relationships. Such a calibrated Z,Y plane with measuring points 160 calibrated in the X direction is illustrated in FIG. 16. Directional relationships of all the translations can also be produced by measuring a ball plate having balls calibrated in all directions.

Figure 17:
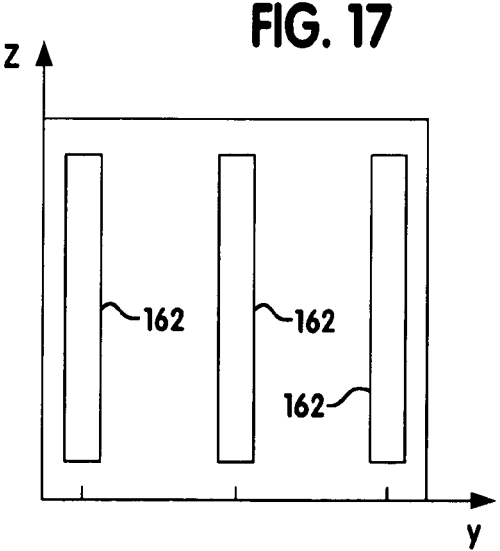
FIG. 17 show alternatives to the recording of measuring lines with the aid of mechanical calibration apparatuses instead of the laser measuring machines of FIG. 6.

Also of particular advantage is a large plate with straightness standards 162 permanently clamped on and aligned, as illustrated in FIG. 17. These straightness standards can be used to determine all required translations (for example zTx and zTy in the case of Z multiple lines) directly and with directional relationship simply by scanning the straightness standards.

What is claimed is:

1. A method for correcting guiding errors in a coordinate measuring machine having a moveable measuring head, having a guiding mechanism for guiding the measuring head in at least a first and a second spatial direction, the first and second spatial directions being different from one another, and having scales for determining a position of the measuring head, the guiding errors resulting from at least one of geometric and elastic characteristics of the guiding mechanism and characteristics of the scales, the method comprising defining at least one first and one second measuring line, wherein the first measuring line is assigned to the first spatial direction and the second measuring line is assigned to the second spatial direction, the first and second measuring lines intersecting thereby defining a first point of intersection, and determining correction values along the first and second measuring lines at predetermined values of the scales, wherein the correction values determined along the at least one first measuring line are modified such that a modified correction value of the first measuring line at the first point of intersection assumes a first predetermined value, and wherein the correction values determined and stored along the at least one first measuring line represent relative correction values with respect to the first predetermined value.

2. The method of claim 1, wherein the correction values determined along the at least one first measuring line are modified by adding or subtracting an offset.

3. The method of claim 1, wherein the first predetermined value is equal to zero.

4. The method of claim 1, wherein at least two second measuring lines are assigned to the second spatial direction, the at least one first and the at least two second measuring lines defining at least the first and a second point of intersection, and wherein the correction values determined along the at least one first measuring line are modified such that a modified correction value of the at least one first measuring line at the second point of intersection assumes a second predetermined value.

5. The method of claim 4, wherein the second predetermined value is equal to zero.

6. The method of claim 5, wherein the correction values determined along the at least one first measuring line are modified keeping the modified correction value of the first measuring line at the first point of intersection at the first predetermined value.

7. A method for correcting measurement errors in a coordinate measuring machine comprising a movable measuring head and a guiding mechanism for guiding the measuring head in at least a first and a second spatial direction, the first and second spatial directions being different from one another, wherein correction values are determined along at least two first measuring lines extending in the first spatial direction in order to correct for measurement errors, wherein the correction values determined along the at least two first measuring lines are modified for providing modified correction values, wherein modified correction values of each first measuring line assume a predetermined correction value at a point of intersection with a second measuring line along the second spatial direction, and wherein the correction values determined and stored along the first measuring lines are modified so as to provide modified correction values which represent relative correction values with respect to the predetermined value.

8. The method of claim 7, wherein the correction values determined along the first measuring lines are modified by adding or subtracting an offset.

9. The method of claim 7, wherein the predetermined value is equal to zero.

10. A method for determining and correcting guiding errors in a coordinate measuring machine comprising a movable measuring heads, elements for movably guiding the measuring head in at least two different spatial directions, and comprising scales and measuring lines which are assigned to the spatial directions, wherein the measuring lines of different spatial directions intersect, wherein correction values are determined along the measuring lines at predetermined values of the scales in order to correct for errors of the scales or the elements for movably guiding the measuring head, wherein the correction values which are determined along a measuring line of a first spatial direction are modified such that a modified correction value of said measuring line assumes a first predetermined value at a point of intersection with a first measuring line of a second spatial direction, and wherein the correction values determined and stored along the measuring line are modified so as to provide modified correction values along the measuring line, wherein the modified correction values represent relative correction values with respect to the first predetermined value.

11. The method of claim 10, wherein the correction values determined along the measuring line of the first spatial direction are modified by adding or subtracting an offset.

12. The method of claim 10, wherein the first predetermined value is equal to zero.

13. The method of claim 10, wherein at least two second measuring lines are assigned to the second spatial direction, the at least one first and the at least two second measuring lines defining at least the first and a second point of intersection, and wherein the correction values determined along the at least one first measuring line are modified such that a modified correction value of the at least one first measuring line at the second point of intersection assumes a second predetermined value.

14. The method of claim 13, wherein the second predetermined value is equal to zero.

15. The method of claim 14, wherein the correction values determined along the at least one first measuring line are modified keeping the modified correction value of the first measuring line at the first point of intersection at the first predetermined value.

16. The method of claim 15, wherein the modified correction values of the first measuring line are obtained by $$fg(xi)=f(xi)-(h/xh) * xi$$

with f(xi) representing a sequence of correction values over points xi along the first measuring line, and h specifying a deviation of the correction value f(xh) from zero at the first point of intersection.

17. The method of claim 10, wherein a plurality of first measuring lines are assigned to the first spatial direction, the plurality of first measuring lines running along the first spatial direction.

18. The method of claim 17, wherein the plurality of first measuring lines define a plane having a plane normal, and wherein the first measuring lines are additionally subjected to a rectangularity measurement with reference to the plane normal, wherein a deviation in the rectangularity of a single measuring line from a common reference value is formed, and wherein the correction values of the single measuring line are manipulated, the extent of the manipulation being determined from the said deviation.

19. The method of claim 18, wherein the extent of the manipulation is proportional to the said deviation.

20. The method of claim 17, wherein correction values along the plurality of first measuring lines are determined, wherein the correction values of one from the plurality of first measuring lines are selected, and wherein the selected correction values are subtracted from the correction values of the non-selected measuring lines.

21. The method of claim 20, wherein the selected correction values are stored as primary correction values in a correction value memory.

22. The method of claim 21, wherein the primary correction values are determined and stored individually for an individual coordinate measuring machine.

23. The method of claims 20, wherein the results obtained by the subtraction are stored as secondary correction values in the correction value memory.

24. The method of claim 20, wherein the secondary correction values are determined on an individual coordinate measuring machine of a specific type and are stored in correction value memories of other coordinate measuring machines of the same type.

25. The method of claim 17, wherein correction values along the plurality of first measuring lines are determined, and wherein further correction values are determined at measuring points which do not lie on the plurality of first measuring lines by interpolation of the correction values determined along the first measuring lines.

26. The method of claim 25, wherein interpolation is based on two closest correction values determined along the first measuring lines.

27. The method of claim 25, wherein interpolation is based on a two-dimensional interpolation method or a three-dimensional interpolation method.

28. The method of claim 10, wherein the coordinate measuring machine is one from the group comprising: a horizontal arm measuring machine having a column which is adapted to move in the a first direction, the column supporting a horizontal arm having a measuring head, the horizontal arm being adapted to move in a second and a third direction; a gantry machine having a gantry moveable in a first direction and carrying a carriage moveable in a second direction, the carriage supporting a center sleeve movable in a third direction and including a measuring head; and a coordinate measuring machine of cantilever design or any other desired kinematic chain.

29. A coordinate measuring machine comprising a movable measuring head, elements for guiding the measuring head in at least two different spatial directions, scales and measuring lines which are assigned to the spatial directions, the measuring lines of different spatial directions intersecting, and comprising a correction value memory in which correction values determined along the measuring lines at predetermined values of the scales are stored for correcting errors of the scales or the elements for guiding the measuring head, wherein a correction value of a first measuring line of a first spatial direction has a predetermined value at a point of intersection with a second measuring line of another spatial direction, and wherein the correction values stored along the first measuring line are modified so as to provide modified correction values along the first measuring line, wherein the modified correction values represent relative correction values with respect to the predetermined value.

30. A correction value storage medium for storing correction values for a coordinate measuring machine having a movable measuring head, elements for guiding the measuring head in at least two different spatial directions, scales and measuring lines which are assigned to the spatial directions, wherein the measuring lines of different spatial directions intersect, the correction value storage medium comprising correction values for correcting errors of the scales or the elements for guiding the measuring head, wherein the correction values are determined along the measuring lines at predetermined values of the scales, wherein correction values of a first measuring line of a first spatial direction are stored in a modified form such that a modified correction value of said first measuring line has a predetermined value at the point of intersection with a second measuring line of another spatial direction, and wherein the correction values for the first measuring line are modified so as to provide modified and stored correction values along the first measuring line, wherein the modified correction values represent relative correction values with respect to the predetermined value.

31. The correction value storage medium of claim 30, wherein correction values of a predetermined measuring line running along the first spatial direction are stored as primary correction values in the correction value memory.

32. The correction value storage medium of claim 31, comprising secondary correction values which are obtained as results of a subtraction of respective correction values of a selected one of said measuring lines from correction values of non-selected measuring lines running along the first spatial direction.

* * * * *

UNITED STATES PATENT AND TRADEMARK OFFICE
CERTIFICATE OF CORRECTION

PATENT NO. : 7,142,999 B2  
APPLICATION NO. : 10/944955  
DATED : November 28, 2006  
INVENTOR(S) : Günter Grupp et al.

Page 1 of 1

It is certified that error appears in the above-identified patent and that said Letters Patent is hereby corrected as shown below:

<u>Title Page</u>,
Item [75] Inventors, line 1, "Böohmenkirch" should be -- Böhmenkirch --.

<u>Column 14</u>,
Line 33, "heads" should be -- head --.

<u>Column 15</u>,
Line 44, "claim 20" should be -- claim 23 --.

Signed and Sealed this

Third Day of April, 2007

JON W. DUDAS  
*Director of the United States Patent and Trademark Office*